United States Patent [19]

Medendorp

[11] 4,316,712
[45] Feb. 23, 1982

[54] PRESS AND ACTUATOR THEREFOR

[76] Inventor: Roger L. Medendorp, 34-71st St., Grand Rapids, Mich. 49508

[21] Appl. No.: 205,530

[22] Filed: Nov. 10, 1980

[51] Int. Cl.³ .................. B29C 17/00; B29C 11/00
[52] U.S. Cl. .................................. 425/292; 425/388; 425/398; 425/451.6; 425/593; 425/DIG. 222
[58] Field of Search ............... 425/78, 289, 292, 388, 425/394, 398, 593, DIG. 222, 451.6, 407

[56] References Cited

U.S. PATENT DOCUMENTS

| | | | |
|---|---|---|---|
| 3,166,790 | 1/1965 | Keys | 425/388 X |
| 3,340,574 | 9/1967 | O'Brien et al. | 425/407 |
| 3,345,691 | 10/1967 | Aoki | 425/451.6 X |
| 3,452,399 | 7/1969 | Blumer | 425/451.6 X |
| 3,518,334 | 6/1970 | Carrigan et al. | 425/292 X |
| 3,561,057 | 2/1971 | Butzko | 425/388 X |
| 3,611,497 | 10/1971 | Gidge et al. | 425/DIG. 222 |
| 3,632,272 | 1/1972 | Herbener | 425/451.6 X |
| 3,712,774 | 1/1973 | Parker | 425/451.6 X |
| 4,155,692 | 5/1979 | Kermoian | 425/292 |

Primary Examiner—J. Howard Flint, Jr.
Attorney, Agent, or Firm—Price, Heneveld, Huizenga & Cooper

[57] ABSTRACT

A press includes a fixed platen, a vertically movable platen and a double toggle actuating mechanism for raising and lowering the movable platen. A piston cylinder breaks one of the toggle mechanisms, which in turn breaks the second toggle mechanism to raise the platen. A balance mechanism is operatively connected to the movable platen and assists in raising the movable platen and supporting the same in its raised position. A cut piston cylinder is connected to one of the toggle mechanisms.

23 Claims, 7 Drawing Figures

PRESS AND ACTUATOR THEREFOR

BACKGROUND OF THE INVENTION

The present invention relates to thermoforming presses and more particularly to presses used to form three-dimensional shaped articles from polymeric sheet stock.

Various types of presses are presently available for forming shaped articles, such as containers, from polymeric sheet stock. One such type of press is utilized in a process called thermoforming. It uses a mold, or multiplicity of molds, each having a peripheral cutting knife. The upper platen of the press supports the molds and is movable while the lower platen is a flat surfaced heating platen attached to the lower stationary bed of the press. This lower heating platen has small air holes which communicate a source of air pressure or a vacuum. Thus the polymeric sheet is placed on the platen, the molds are lowered until the knives are slightly embedded in the polymeric sheet, and the vacuum is connected to the heating platen. While the vaccum holds the sheet against the heating platen, the sheet is heated to a plasticized state. The vacuum is then removed and air pressure is applied through the air holes causing the polymeric sheet to stretch and be forced into the shape of the mold on the upper platen.

In some instances, the cavity of the mold is subjected to vacuum in which case the vacuum causes the polymeric sheet to be formed in the mold. This process would be called vacuum forming whereas applying pressure through the air holes is called pressure forming. When the plasticized sheet contacts the mold surface it is relatively cooled and sets in the form of the mold. At this time the press closes slightly further and the knives cut through the polymeric sheet after which the press is opened and the three-dimensionally shaped article is removed.

An example of one such press may be found in U.S. Pat. No. 3,340,574 entitled UNIVERSAL FORMING PRESS and issued on Sept. 12, 1967, to O'Brien et al. The forming press disclosed in this aforementioned patent includes a frame structure supporting an upper and a lower platen. The upper platen is suspended on a toggle linkage. A piston cylinder attached directly to the toggle linkage shifts the upper platen towards and away from the lower platen.

Presses of the aforementioned type have significant height and space requirements. These requirements result in installation problems and limit the facilities which can be used. Also, significant power requirements are experienced to raise and lower the heavy, movable platen and actuating linkages. Some presses employ only hydraulic pressure to hold the dies in position during the forming operation. Significant pressures are developed between the die and the lower platen, and relatively large piston cylinder assemblies are required to hold the die shut against the lower platen.

A need exists for a forming press and actuating mechanism therefor whereby the height and space problems heretofore experienced are eliminated, which is capable of raising and lowering a movable die and holding the die in forming position with a significant reduction in power requirements and which is adaptable to pneumatic or mechanical operation.

SUMMARY OF THE INVENTION

In accordance with the present invention, a unique forming press and actuating mechanism therefor are provided whereby the problems heretofore experienced are substantially alleviated and the aforementioned needs are satisfied. Essentially, the press includes a main support frame and a pair of platens which are relatively movable and are adapted to support a forming die. An actuating means is operatively connected to one of the platens and mechanically locks the platens in the forming position. A balance means is provided for assisting in the raising and supporting of the die in a position away from the other platen.

In further aspects of the invention, the actuating means includes a double toggle link for raising and lowering the movable platen and means for shifting it to cut the formed product. The balance means includes a piston cylinder actuator and a beam operatively connected to the movable platen. A piston cylinder actuator engages one of the toggles which toggle is operatively connected to the pivot point of the other toggle to raise and lower the movable platen. The balance means also makes the press adaptable to pneumatic operation.

The press in accordance with the present invention permits the actuating mechanism to be positioned below the fixed platen. The actuator in combination with the balance means significantly reduces the height and space requirements of the press as well as the power required to raise and lower the movable platen and hold such platen in a fixed forming position. A mechanical lock is provided and hydraulic or other fluid pressure is not needed to hold the platen in the forming position.

DETAILED DESCRIPTION OF THE PREFERRED EMBODIMENT

Figure 2:
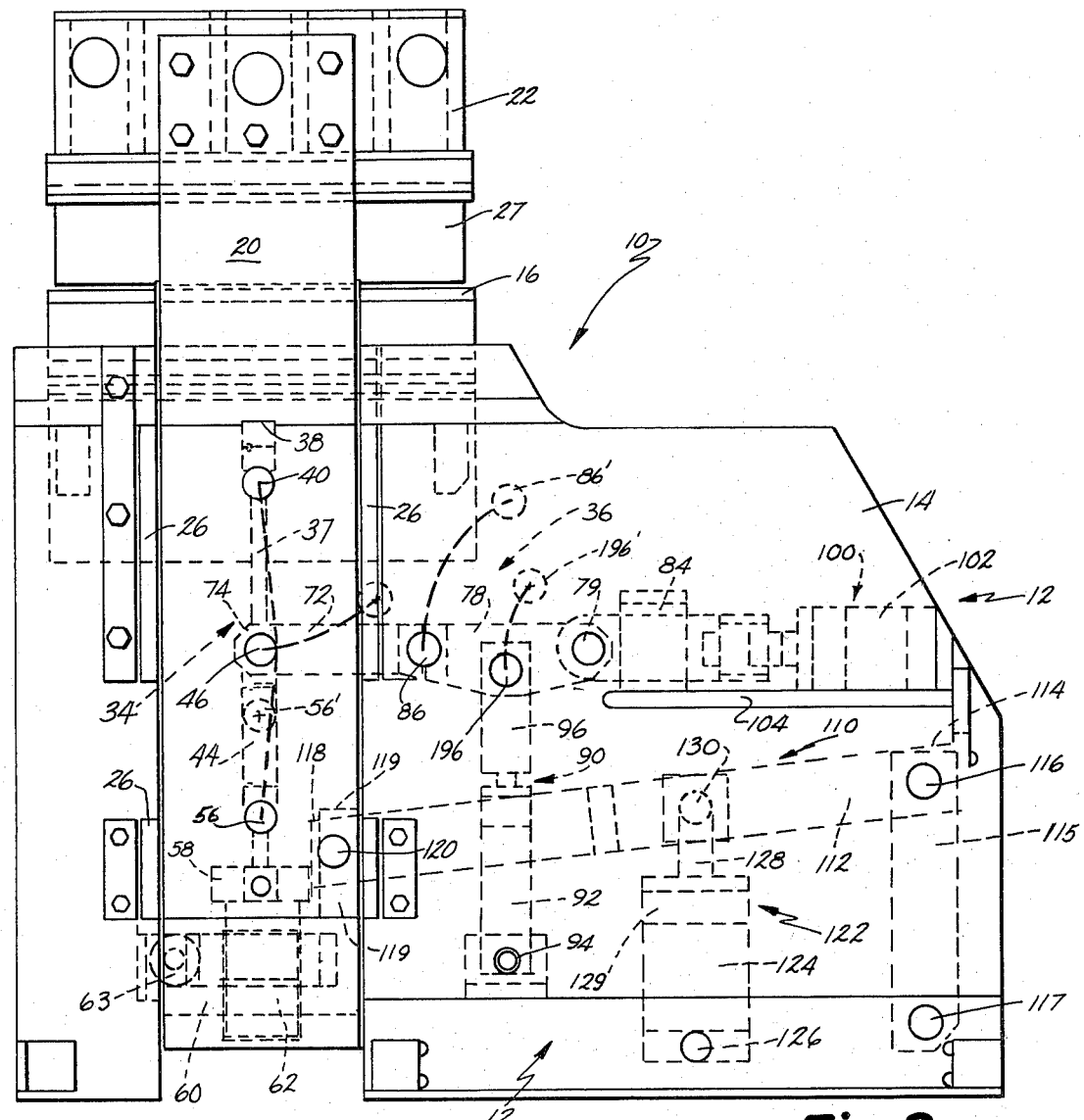
FIG. 2 is a greatly enlarged, side elevational view of the forming press.
Figure 1:
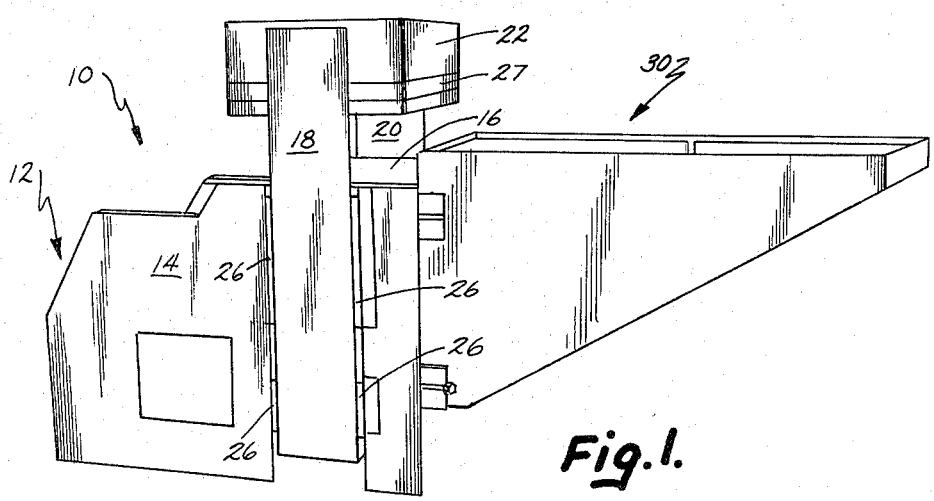
FIG. 1 is a side, perspective view of a forming press in accordance with the present invention and having a stock feed mechanism attached thereto.
Figure 3:
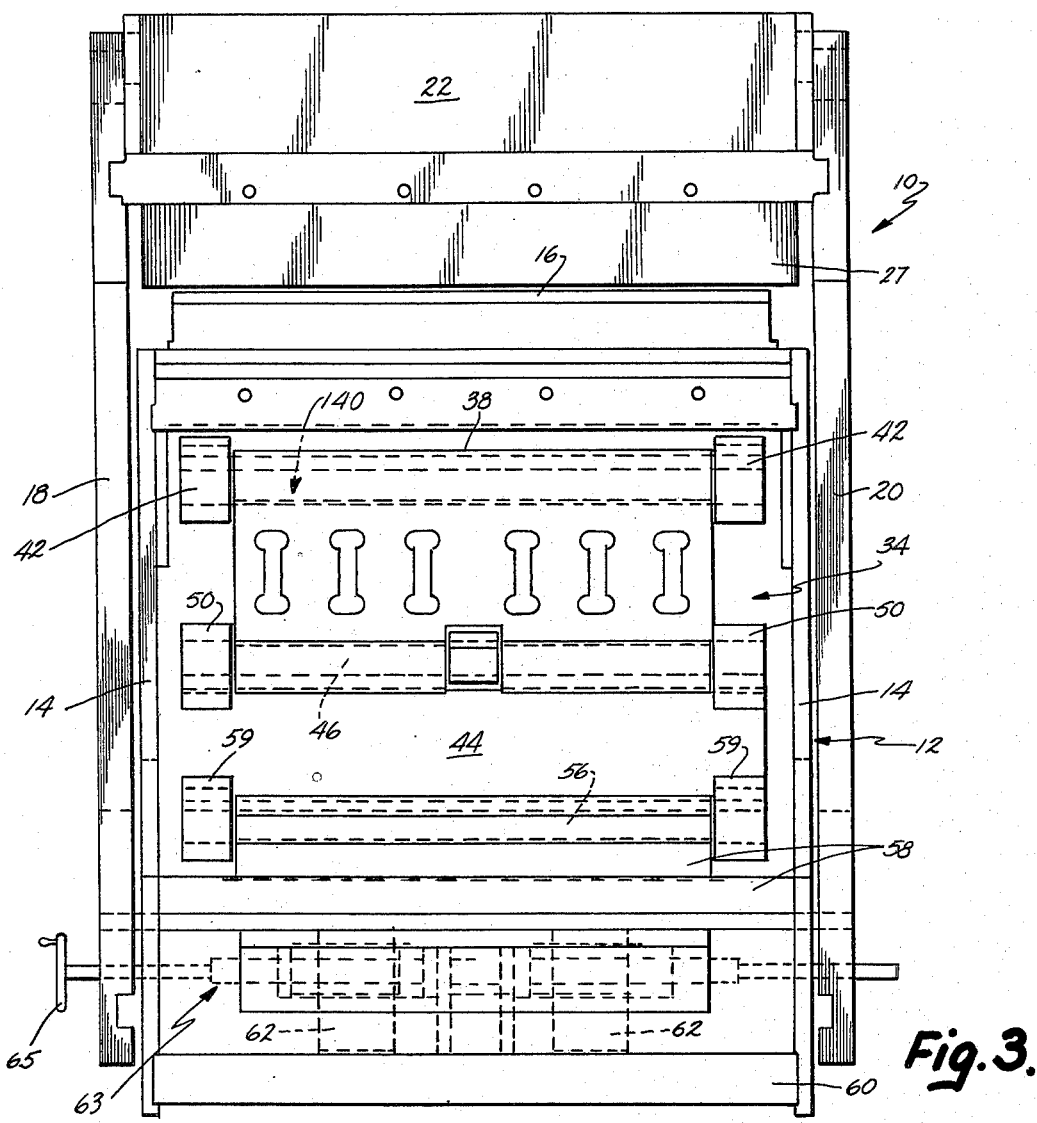
FIG. 3 is an enlarged, front elevational view of the forming press.
Figure 4:
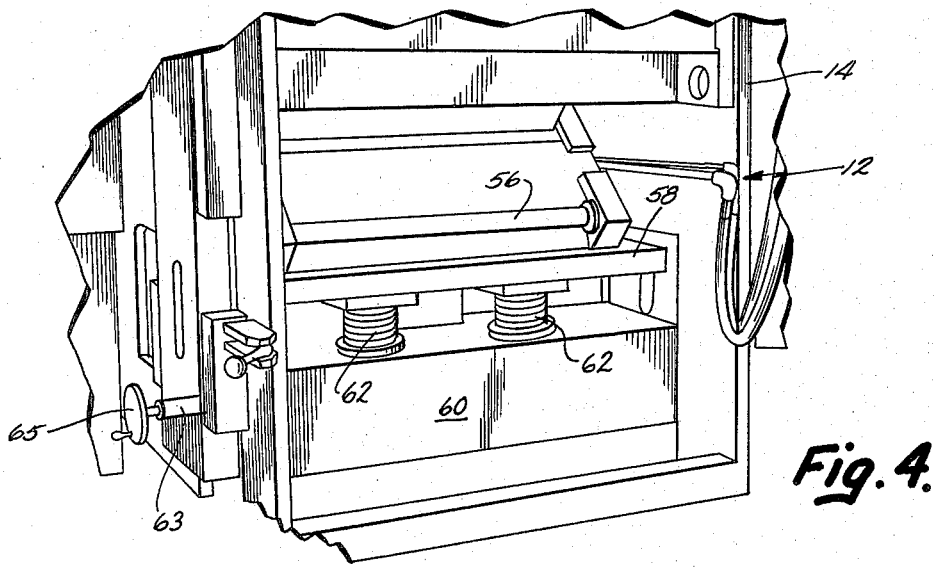
FIG. 4 is a fragmentary, front perspective view of the forming press.

With reference to the drawings, a preferred embodiment of the press in accordance with the present invention is illustrated in FIGS. 1, 2 and 3 and generally designated 10. Press 10 includes a main support frame 12 having interconnected side plates 14. Supported on the top of the frame 12 is a fixed platen 16. A pair of actuator plates 18, 20 support an upper, movable platen 22 for vertical movement towards and away from the fixed, lower platen 16. Side plates 18, 20 are positioned between guide blocks 26 secured and located at each side of the main frame side plates 15 (FIG. 1 and 2). Guide blocks 26 define a track for plates 18, 20. Suitable die 27 is secured to platen 22.

As seen in FIG. 1, a conventional web or stock advance mechanism 30 is secured at the forward end of press 10. The web or sheet stock advance mechanism 30 is operable to shift the stock material to a position between the platens 16 and 22. It is preferred that mechanism 30 be pivoted to frame 12 so that it may be swung to one side. This provides easy access to the platens and die. Since mechanism 30 can be of many different conventional designs, it will not be discussed in detail herein.

Platens 16, 22 and the die 27 are of conventional construction and are well known to those of ordinary skill in the art. Typically, the lower platen would include suitable heaters (not shown) and water cooling passages. As should be apparent to one of ordinary skill, the polymeric sheet stock is moved between the platen 16 and die 27 when the platen 22 is in an upper or first position. The actuator plates 18, 20 are moved downwardly causing the die 27 to move into contact with the polymeric sheet material. The application of first heat and then pressure to the sheet stock forms the stock into the desired three-dimensional configuration.

Movable platen 22 is raised and lowered with respect to the platen 16 by an actuating mechanism including a first toggle subassembly 34 and a second toggle subassembly 36 (FIG. 2). As best seen in FIGS. 2 and 3, toggle subassembly 34 includes a first link or plate 37 pivoted along an upper edge 38 to the main frame 12 immediately below the fixed platen 16. A pivot rod 40 supported by suitable journals 42 secures link 37 to the frame. A second toggle link 44 is pivotally secured to link 37 by a pivot rod 46. Pivot rod 46 extends through a pair of end blocks 50 (FIG. 3) which are secured to the upper edge of link 44. The lower edge of link 44 is pivotally secured to a first cross beam 54 by means of a pivot rod 56. Rod 56 is secured to the top of a block 58 and is received at its ends in journals 59. Journals 59 are secured to the opposite ends of link 44. Block 58 is connected to a main cross beam 60 through a pair of screw jacks 62. Jacks 62 are actuated individually or together by conventional structure through a worm drive 63 rotated by a handle 65. Main cross beam 60 is in turn secured to actuator plates 18, 20.

Jacks 62 interconnected to cross beams 58 and 60 permit leveling and adjustment of upper platen 22 with respect to platen 16. Movement of jacks 62 so that the vertical distance between cross beams 58 and 60 is increased results in the movable platen 22 being moved closer to stationary platen 16. Selective actuation of either of jacks 62 will shift platens 22 and 16 relative to each other to insure accurate leveling of the dies secured thereto. Side actuator plates 18, 20 and cross beam 60 define a carrier member or rectangular frame structure which is shiftable vertically through toggle 34 relative to the main frame 12.

Figure 6:
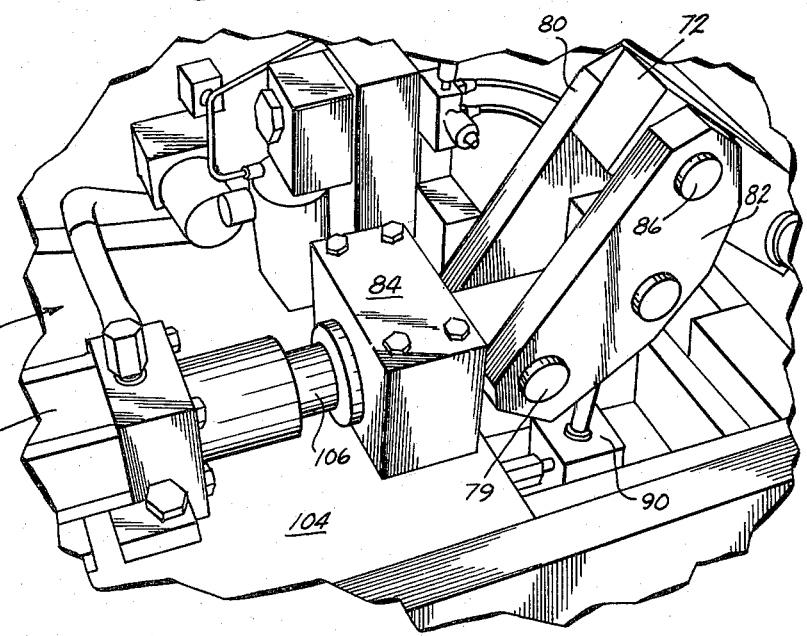
FIG. 6 is a fragmentary, perspective view of the press showing one of the toggle mechanisms and a cut piston cylinder incorporated in the present invention.
Figure 7:
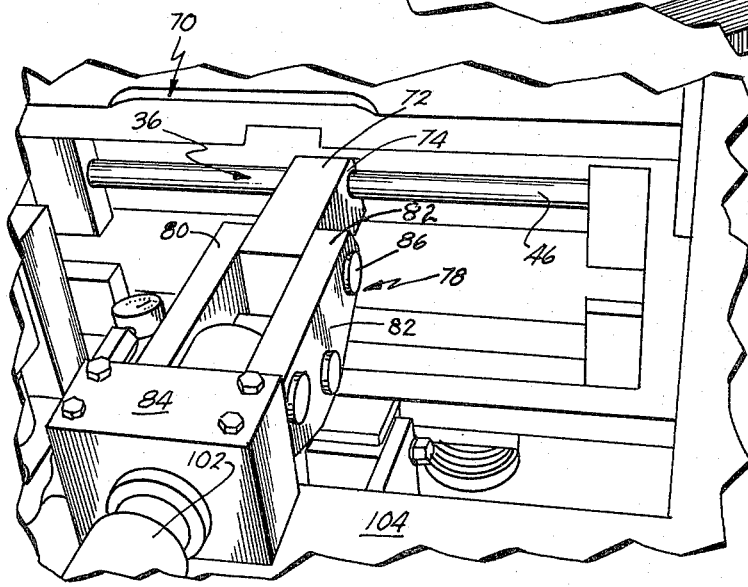
FIG. 7 is a fragmentary, rear perspective view showing the toggle mechanisms in their actuated positions.

The main toggle 34 is actuated by second toggle 36. As best seen in FIGS. 2, 6 and 7, second toggle 36 includes a first link 72 pivoted at an end 74 to the main pivot rod 46 of toggle link 34. Link 72 has a bore formed therein through which rod 46 extends. Toggle subassembly 36 includes a second bifurcated link 78 having legs 80, 82 joined to a base plate 84. A pivot pin 86 extends through links 80, 84 and the rear end of link 72.

As seen in FIGS. 2 and 6, a main lift ram or piston cylinder assembly 90 is secured to link 78 of toggle actuator 36. Piston cylinder assembly 90 is of the double acting type and includes a cylinder 92 pivoted at its lower end 94 to the main frame 12. An actuator rod or piston rod 96 is pivoted at its upper end to link 78 at pivot 196. As should be apparent, extension of rod 96 shifts link 78 vertically about its rear pivot 79. This results in breaking of the link 34 and hence movement of the pivots 196, 86, 46 and 56 to the points 196', 86', 46' and 56', respectively, and the resultant vertical movement of actuator plates 18, 20 and platen 22.

Retraction of piston rod 96 into cylinder 92 lowers links 78 thereby extending the toggle subassembly 34 and 36 to shift side actuator plates 18, 20 downwardly moving platen 22 towards platen 16. The mechanical advantage generated by links 78 and 72 shifts toggle 34 and a significant force is created to lower the movable platen 22. Platen 22 is held in position above platen 16 during the forming operation due to the mechanical locking effect caused by substantial in-line positioning of the pivot rods 40, 46, 56 and 46, 86 and 79.

In the preferred form, toggle mechanism 34, 36 and piston cylinder assembly 90 are dimensioned and positioned so that during the forming operation rod 46 is not directly beneath or in line with rods 40, 56. It is preferred that rod 46, when viewed in FIG. 2, be positioned slightly to the right side of the center line of the pivot points. Actuator 90 in conjunction with the mechanical locking effect of toggle 36, however, holds the platens 22, 16 in position during forming against the pressure generated during the forming operation.

Platens 22, 16 are not driven to a final, cut position until after the article is formed therebetween. This final shifting of the platens 16, 22 causes the dies to cut through the polymeric sheet material positioned therebetween. This permits removal of the formed article from the dies after platen 22 has been raised.

The final cutting action is accomplished by a cut piston cylinder assembly 100. As seen in FIGS. 2, 6 and 7, cut piston cylinder assembly 100 includes a cylinder 102 fixed to a support plate 104 extending between side plates 14 of main frame 12. A piston rod 106 of assembly 100 is connected through bearing block 84 to rod 79 of toggle link 36. When main lift piston cylinder assembly 90 has been shifted to the position shown in FIG. 2 and the links of toggle 36 are in a centered position, rod 106 is extended so that a force is generated through rods 79, 86 and 46. This moves the links of toggle 34 to their final or home position, lowering platen 22 with respect to platen 16 to accomplish the cutting action.

In order to reduce the power requirements and the size of the piston cylinder assembly 90, a balancing means generally designated 110 is included. Balancing means 110 assists in raising actuator plates 18, 20 and hence the platen 22 and in holding platen 11 in its raised or open position. Balance means 110 includes a main balance beam 112 secured at a rear end 114 by pivot pin 116 to main frame 12 through link 115 which is pivoted at 117 to frame 12. The forward end 118 of balance beam 112 is pivotally secured to an upwardly extending part 119 of the main cross beam 60 by a pivot pin 120.

Figure 5:
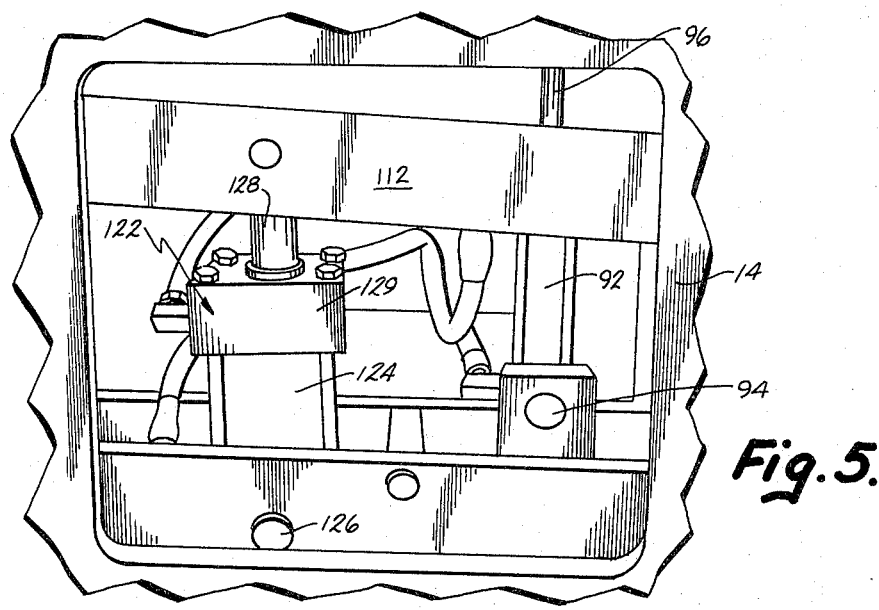
FIG. 5 is a fragmentary, side elevational view of the press showing the balance means incorporated therein.

A balance piston cylinder 122 (FIGS. 2 and 5) includes a cylinder 124 having a lower end pivoted to the main frame by a pivot pin 126. A piston rod 128 extends from cylinder 124 and is pivoted to main beam 112 by a pivot pin 130. The balance cylinder 124 of the single acting type can be loaded by a conventional accumulator. Balance piston cylinder 122 is, in effect, a fluid spring generating a force to lift and counterbalance the weight of the actuator frame including plates 18, 20 and the main cross beam 60. When the actuator plates 18, 20 and hence upper platen 22 are lowered to the operating or forming position, the force generated by balance piston cylinder 122 is overcome by the weight of the vertically movable components and by the force generated by double acting main lift piston cylinder 90. The balance means 110 significantly reduces the size and power requirements of the main actuator necessary to lift, lower and hold the platen 22 in position. Further, the actuating mechanism including the balancing means 110 results in a significant reduction in the height and hence space requirements necessary for the press 10. Prior presses have a significant vertical height with the main actuator structure positioned above a bed supporting the lower platen 16. The press in accordance with the present invention, however, has an overall height which is significantly less than the total height of prior presses. Balance means 110 permits the press to be operated by pneumatic piston cylinders as well as hydraulic piston cylinders.

In a presently existing embodiment of the press in accordance with the present invention, piston cylinders 90 and 100 are double acting and hydraulically actuated. Balance cylinder 122 can be loaded by an accumulator. A suitable electrical control system for operating a hydraulic pump and solenoid actuated valves is provided. The control system and elements thereof are conventional and therefore are not disclosed in detail herein. In the existing embodiment, the main lift piston cylinder 90 is a two-inch cylinder and the piston rod or stem is one inch in diameter. The balance cylinder has a five-inch bore and the cut cylinder has a four-inch bore. The area below piston 129 of cylinder 122 is maintained at a pressure of 1200 psi during the lifting or raising of platen 22. When main lift piston cylinder 90 is actuated to lower the platen, the force generated for a given fluid pressure will be less than the force generated during the raising or extension of the piston cylinder. This is the result of the piston rod extending from the piston therein reducing the area against which the pressure acts. As a result, it is presently preferred with a hydraulic system to reduce the pressure within the balance cylinder 124 during the retraction or lowering step. In the existing embodiment, the pressure is reduced from approximately 1200 psi to approximately 600 psi.

OPERATION

In operation, a suitable die is secured to platen 22. With the actuator plates 18, 20 and platen 22 in its lowered position, that is, with piston cylinders 90, 122 and 100 retracted, jacks 62 are actuated through a worm gear drive to level and accurately position the dies with respect to each other. Piston cylinder 90 is actuated so that fluid under pressure enters cylinder 92 to extend rod 96 and hence break toggles 34, 36 and raise side plates 18, 20 and hence platen 22. Movement of the toggle assemblies is schematically shown in FIG. 2. During the extension of the piston cylinder 90, fluid under pressure also enters cylinder 124 from its accumulator and the balance beam will shift about its pivot point 116 to assist in raising and supporting platen 22 in its upper or first position. Next, sheet feed mechanism 30 is actuated and a sheet of polymeric material is moved between the dies supported by platens 16, 22.

When the sheet of material is in position, piston cylinder assembly 90 is retracted and the pressure within cylinder 124 of the balance cylinder is reduced. Toggle 36 is shifted to its locked position thereby shifting links 37, 44 and lowering actuator plates 18, 20. As previously stated, pivot rod 46 of toggle 34 is positioned by toggle 36 just short of its full lock or in-line position. This is shown schematically in FIG. 2. The forming operation is then accomplished through the coaction of the dies supported by platens 16, 22.

At the completion of the forming operation, the cut cylinder assembly 100 is extended, thereby shifting links 72, 78 to the left, when viewed in FIG. 2, and shifting pivot rod 46 to its home or locked position fully in line with pivot rods 40, 56. The cut cylinder assembly is shown in its extended position in FIG. 2. Actuation of cut cylinder assembly 100 shifts the die secured to platen 22 in contact with the platen 16 cutting the formed object from the sheet of polymeric material. Cut cylinder assembly 100 is then retracted to its initial position and the cycle may be repeated. Preferably, the control system automatically cycles the cut cylinder and then raises the upper platen.

The press and actuating mechanism therefor in accordance with the present invention significantly reduces the power requirements and the height and space requirements of a forming press. A reduction of approximately one half the motor horse power requirements for a hydraulic system has been obtained through the present invention when compared with a forming press of the type disclosed in aforementioned U.S. Pat. No. 3,340,574. Further, use of the balance piston cylinder subassembly 122 and balance beam 112 would permit the press to be operated pneumatically. The press and actuating mechanism therefor is readily adapted to and capable of achieving significant cost economics when compared to the prior devices.

In view of the foregoing description, those of ordinary skill in the art will undoubtedly envision various modifications to the present invention which would not depart from the inventive concepts disclosed herein. It is therefore expressly intended that the above description should be considered as only that of the preferred embodiment. The true spirit and scope of the present invention may be determined by reference to the appended claims.

The embodiments of the invention in which an exclusive property or privilege is claimed are defined as follows:

1. A forming press including a main frame, a fixed platen supported on the main frame, a movable platen supported on the main frame for movement towards and away from the fixed platen, and mechanical actuating means for shifting said movable platen from a first, open position to a second, forming position and holding the movable platen in the second, forming position, said mechanical actuating means comprising:
   first toggle means mounted on said main frame and operatively connected to said movable platen for moving said movable platen, said first toggle means being movable from a first position at which said movable platen is in its first position to a second position at which said movable platen is in its second position;
   shifting means connected to said first toggle means and said main frame for shifting said first toggle means between its first and second positions; and
   balance means operatively connected to said movable platen for assisting said shifting means and for assisting in the supporting of said movable platen when said movable platen is in its first position.

2. A forming press as defined by claim 1 wherein said movable platen is supported by a carrier member which is vertically movable with respect to said main frame.

3. A forming press as defined by claim 2 wherein said balance means comprises:
an elongated beam having an end pivoted to said main frame and another end operatively connected to said movable platen; and
biasing means engaging said beam between the ends thereof for biasing said beam for pivotal movement about said another end by exerting a force which acts to raise said movable platen.

4. A forming press as defined by claim 3 wherein said biasing means comprises a fluid piston cylinder means having a rod pivoted to said elongated beam.

5. A forming press as defined by claim 1 further including cut means on the main frame for shifting said first toggle means when said toggle means is in its second position to cause said platens to shift slightly with respect to each other.

6. A forming press as defined by claim 4 further including cut means on the main frame for shifting said first toggle means when said toggle means is in its second position to cause said platens to shift slightly with respect to each other.

7. A forming press as defined by claim 1 wherein said shifting means includes a second toggle means including a pair of links, a pivot pin interconnecting said pair of links and with one of said links pivoted to said first toggle means and the other of said links pivoted to said main frame.

8. A forming press as defined by claim 7 wherein said shifting means further comprises a fluid actuated lift piston cylinder having a piston rod connected to one of said links of said pair of links.

9. A forming press as defined by claim 8 further including biasing means for biasing said movable platen to its first position to thereby assist said lift cylinder and reduce the lift cylinder power requirements.

10. A forming press as defined by claim 9 further including a fluid actuated cut piston cylinder means on said main frame and operatively connected to said second toggle means for shifting said pair of links towards said first toggle means to thereby cause said movable platen to shift closer to said fixed platen.

11. A forming press as defined by claim 10 wherein said movable platen is secured to a pair of spaced side plates and positioned above said fixed platen, said press further including a cross beam extending between said side plates.

12. A forming press as defined by claim 11 wherein said first toggle means includes a link having an end connected to a pivot rod and an end pivoted to said cross beam.

13. A forming press as defined by claim 12 further including an adjustment means between said link of said first toggle means and said cross beam for adjusting the distance between said link and said cross beam and hence the distance between the platens.

14. A press of the type having a pair of relatively movable platens, at least one adapted to support a forming die and further including actuating means for moving at least one of said platens between a first, open position and a second, forming position, wherein said improvement comprises:
fluid actuator means operatively connected to said actuating means for shifting said platens to a cut position after a forming operation, said actuating means including a toggle means having a link, said fluid actuator means being pivotally connected to said link, and a balance means operatively connected to one of said platens for counterbalancing the weight of said platen to thereby reduce the load on said actuating means when said platens are moved from their second to their first positions.

15. A press as defined by claim 14 wherein said actuating means further comprises:
another toggle means including a first link and a second link joined by a pivot rod, said second link being operatively connected to one of said platens, and wherein said a toggle means includes another link connected to the pivot rod of said another toggle means.

16. A press as defined by claim 15 wherein said actuating means further includes a fluid actuated ram having a rod connected to one of the links of said a toggle means.

17. An actuator adapted to raise and lower a load, said actuator comprising:
a frame;
a first toggle having a pair of pivoted links pivoted together by a rod, one of said links pivoted to the frame and the other of said links pivoted to the load;
a second toggle having a pair of links pivotally interconnected, one of the links of said second toggle being pivoted to said first toggle pivot rod;
a fluid actuator means connected to one of said links of said second toggle for breaking said second toggle to thereby break said first toggle and raise the load; and
a counterbalance means operatively connected to the load for counterbalancing the weight of the load as said fluid actuator means breaks said second toggle to assist in raising the load and in reducing the power requirements for said fluid actuator.

18. An actuator as defined by claim 17 wherein the other of said links of said first toggle is pivoted to said load through another pivot rod supported by a cross beam and wherein said actuator further includes adjustment means between said another pivot rod and said cross beam for adjusting the spacing therebetween.

19. An actuator as defined by claim 17 wherein said counterbalance means comprises:
an elongated beam having an end pivoted to the load; and
fluid actuated biasing means connected to said elongated beam for biasing said beam in a direction to raise the load.

20. An actuator as defined by claim 17 further including another fluid actuator means pivotally connected to an end of the other of said links of said second toggle for shifting said links of said second toggle towards said rod of said first toggle when said links of said second toggle are in a centered position.

21. An actuator as defined by claim 20 wherein said counterbalance means comprises:
an elongated beam having an end pivoted to the load; and
fluid actuated biasing means connected to said elongated beam for biasing said beam in a direction to raise the load.

22. An actuator as defined by claim 21 wherein the other of said links of said first toggle is pivoted to said load through another pivot rod supported by a cross beam and wherein said actuator further includes adjustment means between said another pivot rod and said cross beam for adjusting the spacing therebetween.

23. A form and cut press for forming articles from a sheet of material and of the type having a pair of relatively movable platens mounted on a frame, said platens supporting a forming die and a cutting means, said press further including actuating means for moving at least one of said platens between a first open position, a second forming position and a third cutting position wherein said improvement comprises:

First fluid actuator means operatively connected to said actuating means for shifting said movable platen to a forming position;

said actuating means including a first toggle means extending in a generally vertical direction and having first and second links pivotally connected together at a first pivotal connection, said first link being connected to the movable platen and said second link being supported by said frame, said actuating means also including a second toggle extending generally in a horizontal direction and having third and fourth links pivotally connected together at a second pivotal connection, said third link being connected to said first toggle means at said first pivotal connection and said fourth link being supported by a second fluid actuator mounted on said frame;

said first fluid actuator means being operatively connected to said second toggle means for breaking and extending said second toggle means causing corresponding breaking and extending of said first toggle means and opening and closing of said platen;

said first toggle means being in a near extended position which is just short of its full lock or in-line position when the second toggle means is actuated to extended position by said second fluid actuator;

said second fluid actuator having means for exerting a force on said second toggle means in a direction in line with said first and second pivotal connections when said second toggle means is in extended position and said first toggle means is in near extended position to thereby cause said first toggle means to move to full lock or in-line position so as to move said movable platen to cutting position.

* * * * *